United States Patent
Asakura

(10) Patent No.: US 7,801,579 B2
(45) Date of Patent: Sep. 21, 2010

(54) MOBILE TERMINAL APPARATUS ELIMINATING NOISE IN TRANSITION STATE

(75) Inventor: Jun Asakura, Yamato (JP)

(73) Assignee: Panasonic Corporation, Osaka (JP)

( * ) Notice: Subject to any disclaimer, the term of this patent is extended or adjusted under 35 U.S.C. 154(b) by 215 days.

(21) Appl. No.: 10/575,439

(22) PCT Filed: Oct. 15, 2004

(86) PCT No.: PCT/JP2004/015271

§ 371 (c)(1),
(2), (4) Date: Apr. 11, 2006

(87) PCT Pub. No.: WO2005/039156

PCT Pub. Date: Apr. 28, 2005

(65) Prior Publication Data

US 2007/0060215 A1    Mar. 15, 2007

(30) Foreign Application Priority Data

Oct. 17, 2003   (JP) ............................. 2003-357242

(51) Int. Cl.
*H04B 1/38* (2006.01)

(52) U.S. Cl. .................... 455/575.4; 370/286; 455/570; 379/433.12

(58) Field of Classification Search .............. 455/575.4, 455/575.3
See application file for complete search history.

(56) References Cited

U.S. PATENT DOCUMENTS 6,091,938 A * 7/2000 Go ......................... 455/575.3

2003/0211874 A1 * 11/2003 Mizuta et al. ............ 455/575.4
2004/0235539 A1 * 11/2004 Ohta ...................... 455/575.3

FOREIGN PATENT DOCUMENTS

| EP | 0 726 668 A1 | 8/1996 |
|---|---|---|
| EP | 1345389 A1 * | 9/2003 |
| JP | 5-103064 | 4/1993 |
| JP | 62-104346 | 5/1997 |
| JP | 11-331332 | 11/1999 |
| JP | 2002-305571 | 10/2002 |
| JP | 2003-87362 | 3/2003 |
| JP | 2003-283621 | 10/2003 |

OTHER PUBLICATIONS

Supplemental European Search Report dated Apr. 6, 2010.

* cited by examiner

*Primary Examiner*—Rafael Pérez-Gutiérrez
*Assistant Examiner*—Marcos Batista
(74) *Attorney, Agent, or Firm*—Pearne & Gordon LLP

(57) ABSTRACT

A positional relation sensing section (23) of a control section (22) senses the relative position relation between first and second cabinets (30 and 31) based on output of magnetic sensing elements (20a and 20b) and outputs a position determination signal (S3). If the state is "transition state" in which one cabinet slides and moves based on the position determination signal (S3), a voice control section (24) outputs a mute control signal (S4) to a voice processing section (11) as a muting instruction. Accordingly, all outputs of voice signals collected by a microphone (10) to a receiver (12), a loudspeaker (13), a wireless communication section (16), a short-range wireless communication section (17), and a voice output terminal (14) are stopped.

3 Claims, 6 Drawing Sheets

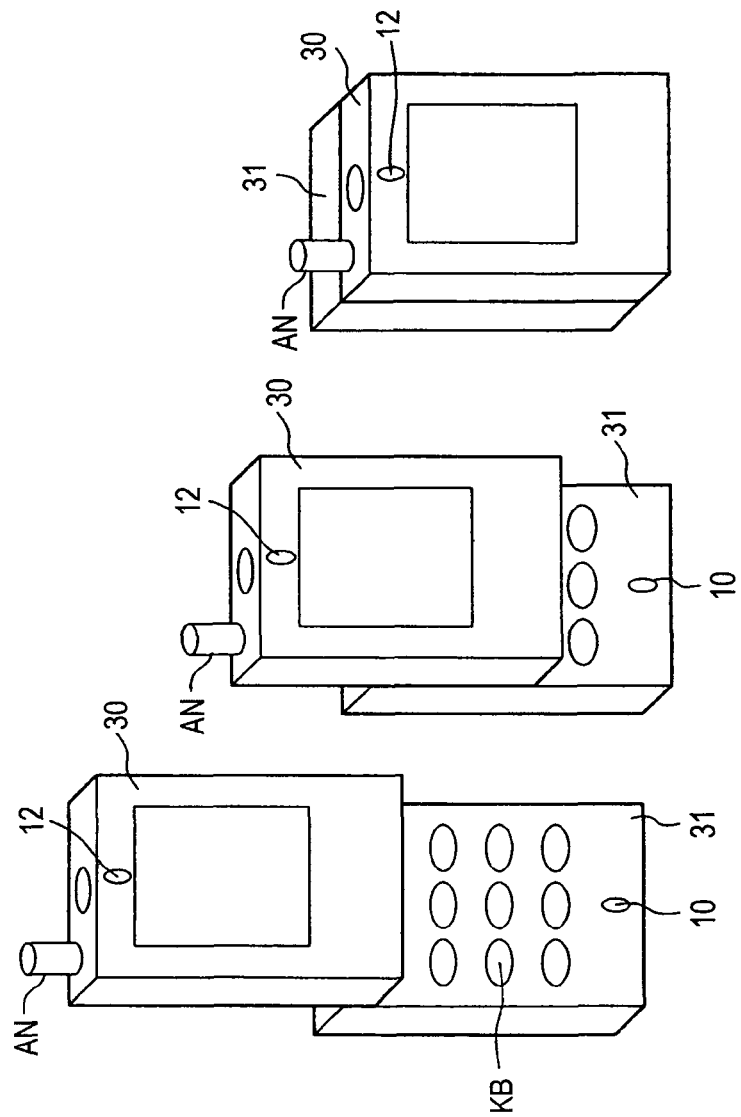

MOBILE TERMINAL APPARATUS ELIMINATING NOISE IN TRANSITION STATE

TECHNICAL FIELD

This invention relates to a mobile terminal apparatus such as a mobile telephone terminal or a Personal Digital Assistant (PDA) having cabinets of a slide-type open and closed structure.

BACKGROUND ART

A slide-type mobile terminal apparatus as described in patent document 1 is available as a mobile terminal apparatus having a cabinet that can be opened and closed. The slide-type mobile terminal apparatus includes two cabinets and can expand and contract as one cabinet slides and moves relative to the other. When the slide-type mobile terminal apparatus is carried, it is placed in a state in which the cabinets are contracted (closed state) for easy carrying of the mobile terminal apparatus; at the telephone conversation time, the mobile terminal apparatus is used in a state in which the cabinets are expanded (open state) for easy telephone conversation.

To actually use the slide-type mobile terminal apparatus, the following disadvantage may occur: When one cabinet is slid relative to the other, the cabinets come in contact with each other on the slide face and a contact sound may occur. If the contact sound is picked up by a microphone and is output from a loudspeaker of the mobile terminal apparatus or a contact sound produced during the telephone conversation is transmitted to the intended party and is output from a loudspeaker of the communication machine of the intended party, the contact sound can be offensive to the user of the mobile terminal apparatus and the intended party; this situation is undesirable.

Patent document 1: JP-A-11-331332.

DISCLOSURE OF THE INVENTION

It is therefore an object of the invention to provide a mobile terminal apparatus that can prevent an unnecessary sound produced when a cabinet is slid and moved from being output through voice output means of the mobile terminal apparatus and the intended party and can be used comfortably.

MEANS FOR SOLVING THE PROBLEMS

The mobile terminal apparatus of the invention is a mobile terminal apparatus that can be opened and closed as a first cabinet slides and moves relative to a second cabinet and includes a voice input section, a voice output section, and a communication section for communicating a voice signal input from the voice input section to an intended party, the mobile terminal apparatus including positional relation sensing means for sensing the relative position relation between the first cabinet and the second cabinet, and voice control means for inhibiting signal transmission from the voice input section to the voice output section and signal transmission from the voice input section to the communication section for muting if the first and second cabinets are in a transition state from an open state to a closed state or the closed state to the open state based on output of the positional relation sensing means.

According to the structure, if the contact sound, etc., produced by slide move of the cabinet is picked up by the voice input section, the voice control means executes muting (prohibition operation of voice output) in the transition state, so that output of the contact sound, etc., through the voice output section of the mobile terminal apparatus and voice output means of the intended party can be prevented reliably. Therefore, it is made possible to use the mobile terminal apparatus comfortably without giving offense to the user of the mobile terminal apparatus or the intended party.

As one form of the invention, in the mobile terminal apparatus described above, the voice control means continues the muting for a predetermined time period from the point in time when the first and second cabinets enter the open state or the closed state from the transition state and releases the muting after the expiration of the predetermined time period.

According to the structure, output of a contact sound, etc., from the voice output section can be prevented reliably. For example, if a contact sound produced by slide move of the cabinet echoes and the echo sound continues, etc., the muting is continued only for the predetermined time period, whereby output of the echo sound, etc., can also be prevented reliably.

As one form of the invention, in the mobile terminal apparatus described above, the positional relation sensing means includes a magnetic material being provided at least in one of the first cabinet and the second cabinet and a magnetic sensing element, provided in the cabinet opposed to the cabinet in which the magnetic material is disposed, for sensing a magnetic field of the magnetic material.

According to the structure, it is made possible to easily and reliably sense the relative position relation between the first and second cabinets.

As one form of the invention, in the mobile terminal apparatus described above, the positional relation sensing means includes a switch which is provided at least in one of the first cabinet and the second cabinet and is pressed as the opposed cabinet makes a slide move.

According to the structure, it is made possible to easily and reliably sense the relative position relation between the first and second cabinets.

The invention can provide the advantages that an unnecessary sound produced when the cabinet is slid and moved can be prevented from being output through the voice output means of the mobile terminal apparatus and the intended party and the mobile terminal apparatus can be used comfortably.

BRIEF DESCRIPTION OF THE DRAWINGS

FIG. 2 is a perspective view to show the appearances corresponding to open and closed states of the mobile telephone terminal of the first embodiment; (a) is a drawing to show the open state, (b) is a drawing to show a transition state, and (c) is a drawing to show the closed state.

Figure 1:
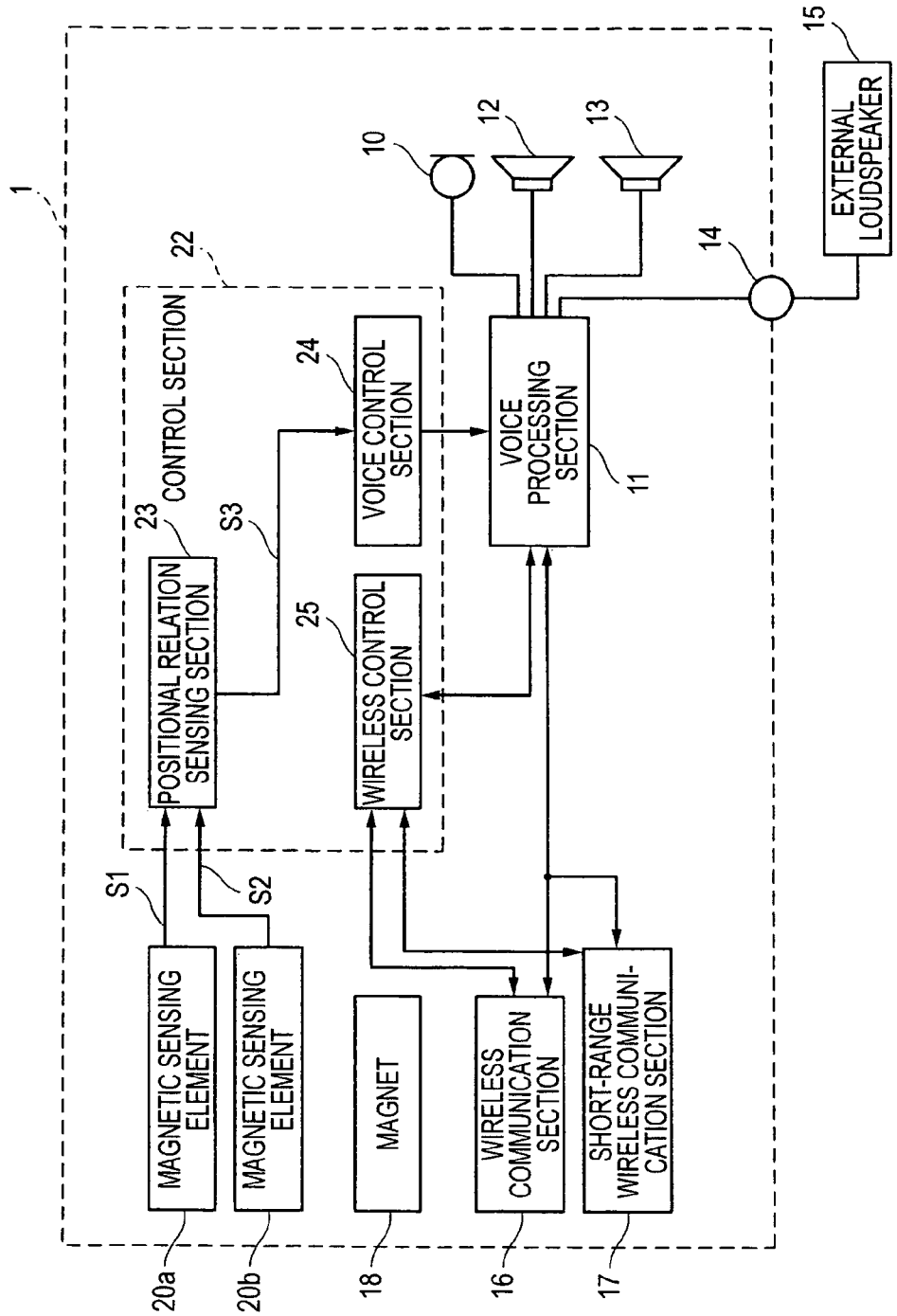
FIG. 1 is a block diagram to show the internal structure of a mobile terminal according to a first embodiment of the invention.

In the figures, numeral 1 denotes a mobile telephone terminal, numeral 10 denotes a microphone, numeral 11 denotes a voice processing section, numeral 12 denotes a receiver, numeral 13 denotes a loudspeaker, numeral 14 denotes a voice output terminal, numeral 15 denotes an external loudspeaker, numeral 16 denotes a wireless communication section, numeral 17 denotes a short-range wireless communication section, numeral 18 denotes a magnet, numerals 20a and 20b denote magnetic sensing elements, numeral 22 denotes a control section, numeral 23 denotes a positional relation sensing section, numeral 24 denotes a voice control section, numeral 30 denotes a first cabinet, numeral 31 denotes a second cabinet, numerals 32a and 32b denote switches, and numeral 34 denotes a mute period adjustment section 34.

BEST MODE FOR CARRYING OUT THE INVENTION

In each embodiment of the invention, a mobile telephone terminal having a cabinet of a slide-type open and closed structure is shown as a structure example of a mobile terminal apparatus.

First Embodiment

FIG. 1 is a block diagram to show the internal structure of a mobile telephone terminal according to a first embodiment of the invention. FIG. 2 is a perspective view to describe the appearances corresponding to open and closed states of the slide-type mobile telephone terminal of the first embodiment.

As shown in FIG. 2 (a) to FIG. 2 (c), the slide-type mobile telephone terminal of the first embodiment can expand and contract as a first cabinet 30 slides and moves relative to a second cabinet 31. The state in which the first cabinet 30 is slid toward the top of the second cabinet 31 and the mobile telephone terminal becomes vertically long as in FIG. 2 (a) is the "open state." The state in which the first cabinet 30 and the second cabinet 31 overlap each other as in FIG. 2 (c) is the "closed state."

The state in FIG. 2 (b) is a state positioned between the open state and the closed state and is a state in which the first cabinet 30 is slid and a transition is made from the "open or closed state" to the "closed or open state," which is called "transition state." In the open state in FIG. 2 (a), an operation key KB provided on the surface (main face) of the second cabinet 31 is exposed.

The first cabinet 30 is provided with an antenna AN projected at an end part and a receiver 12 corresponding to a voice output section at an end part of the surface (main face) The second cabinet 31 is provided with the operation key KB on the surface and a microphone 10 corresponding to a voice input section at an end part. Although not shown, a loudspeaker corresponding to a voice output section is provided in the rear, etc., of the first cabinet 30 or the second cabinet 31. In any state in FIG. 2 (a) to FIG. 2 (c), voice of the intended party during the telephone conversation can be output.

Since user's voice is output as a sidetone from the receiver 12 or the loudspeaker during the telephone conversion, a phenomenon can occur in which an unnecessary contact sound produced by sliding the first cabinet 30 is picked up by the microphone 10 of the mobile telephone terminal and is output from the receiver or the loudspeaker of the mobile telephone terminal or is output from a loudspeaker of the communication machine of the intended party. To prevent such a problem from occurring, the mobile telephone terminal of the embodiment performs mute operation so as not to output the signal collected by the microphone 10 of the mobile telephone terminal in the "transition state" in FIG. 2 (b) (this point is described later).

Next, the internal structure of the slide-type mobile telephone terminal of the embodiment will be discussed with reference to FIG. 1. The mobile telephone terminal 1 includes a magnet 18, a voice processing section 11, a wireless communication section 16, a short-range wireless communication section 17, magnetic sensing elements 20a and 20b, a control section 22, the microphone 10, the receiver 12, and a loudspeaker 13. The control section 22 is made up of a positional relation sensing section 23, a voice control section 24, and a wireless control section 25. The mobile telephone terminal 1 is also provided with a voice output terminal 14 and an external loudspeaker 15 can be connected by a cable through the voice output terminal 14.

The magnetic sensing elements 20a and 20b are elements for sensing magnetism of a magnetic material such as the magnet 18 and outputting a signal, such as Hall elements or magnetic resistance elements; the open or closed state of the cabinets can be sensed according to the output of the magnetic sensing elements 20a and 20b.

The wireless communication section 16 includes a transmission-reception section of PDC, W-CDMA, etc., for conducting wireless communications with a base station. The short-range wireless communication section 17 is communication means of Bluetooth, etc., for example, whereby communications with an external machine with Bluetooth connection established can be conducted.

The positional relation sensing section 23 of the control section 22 senses the position relation between the first and second cabinets 30 and 31 based on the sensing signals of the magnetic sensing elements 20a and 20b and outputs a position determination signal S3 for determining which of the states in FIG. 2 (a) to FIG. 2 (c) the current state is. In the embodiment, the magnetic sensing elements 20a and 20b and the positional relation sensing section 23 implement the function of positional relation sensing means. When the position determination signal S3 output from the positional relation sensing section 23 indicates the "transition state" in FIG. 2 (b), the voice control section 24 of the control section 22 sends a mute control signal S4 to the voice processing section 11 for instructing the voice processing section 11 to perform mute operation to prohibit output of the signal collected by the microphone 10.

The voice processing section 11 prohibits all outputs of the voice signal collected by the microphone 10 (in this case, contact sound produced as the cabinet slides) to the receiver 12 and the loudspeaker 13, to the wireless communication section 16 and the short-range wireless communication section 17, and to the external loudspeaker 15 through the voice output terminal 14. That is, transmission of the voice collected by the microphone 10 to the receiver 12 and the loudspeaker 13, to the wireless communication section 16 and the short-range wireless communication section 17, and to the voice output terminal 14 are all prohibited. In the embodiment, the voice control section 24 and the voice processing section 11 implement the function of voice control means.

Such muting of the voice processing section 11 can reliably prevent unnecessary contact sound produced with a move of the cabinet from being output from the mobile telephone terminal and the communication machine of the intended party.

Figure 3A:
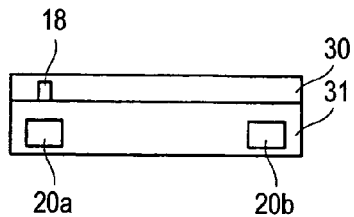
FIG. 3 is a sectional view to describe a mechanism for sensing the relative position relation between cabinets in the mobile telephone terminal of the first embodiment; (a) is a drawing to show the closed state, (b) is a drawing to show the transition state, and (c) is a drawing to show the open state.
Figure 3B:
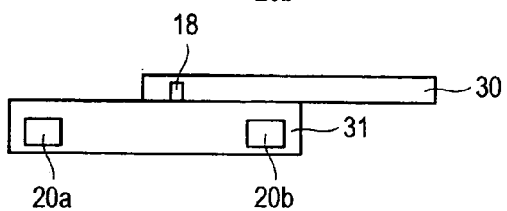
Figure 3C:
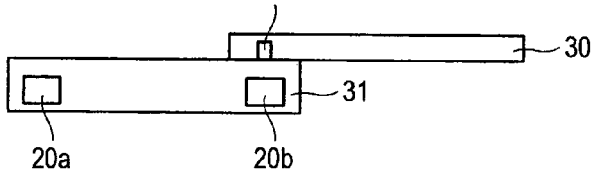

The operation of sensing and determining the relative position relation between the first and second cabinets 30 and 31 (the operation of the positional relation sensing section 23) will be specifically discussed below with reference to FIGS. 3 and 4:

FIG. 3 (*a*) to FIG. 3 (*c*) are sectional views to describe a mechanism for sensing the relative position relation between the cabinets in the mobile telephone terminal of the first embodiment and are drawings corresponding to the closed state, the transition state, and the open state. FIG. 4 is a timing chart to describe the operation of the positional relation sensing section 23 in the first embodiment.

In the "closed state" shown in FIG. 3 (*a*), the magnetic sensing element 20*a* senses the magnetic field of the magnet 18. On the other hand, the magnetic sensing element 20*b* does not sense the magnetic field. In the "transition state" in FIG. 3 (*b*), neither of the magnetic sensing elements 20*a* and 20*b* senses the magnetic field. In the "open state" in FIG. 3 (*c*), the magnetic sensing element 20*a* does not sense the magnetic field; on the other hand, the magnetic sensing element 20*b* senses the magnetic field.

Therefore, change in the relative position between the cabinets 30 and 31 can be sensed based on the sensing signals of the two magnetic sensing elements 20*a* and 20*b*. The positional relation sensing section 23 performs the operation shown in FIG. 4 based on the sensing signals of the two magnetic sensing elements 20*a* and 20*b* and outputs the position determination signal S3 indicating the determination result of the relative position relation between the cabinets 30 and 31.

Figure 4:
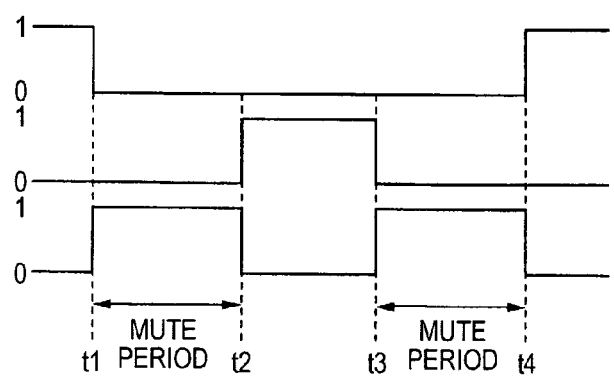
FIG. 4 is a timing chart to describe the operation of a positional relation sensing section in the first embodiment.

(a) to (c) shown at the top of FIG. 4 correspond to the states in FIG. 3 (*a*) to FIG. 3 (*c*). In FIG. 4, in the "closed state" in FIG. 3 (*a*), an output signal S1 of the magnetic sensing element 20*a* is "1" (high) and an output signal S2 of the magnetic sensing element 20*b* is "0" (low).

When the first cabinet 30 is slid from this state and the "transition state" in FIG. 3 (*b*) is entered (time t1), the output signal S1 of the magnetic sensing element 20*a* changes to "0." When the "open state" in FIG. 3 (*c*) is entered, the output signal S2 of the magnetic sensing element 20*b* changes to "1" (time t2).

Subsequently, when the first cabinet 30 is slid and the "transition state" is entered, the output signal S2 of the magnetic sensing element 20*b* changes to "0" (time t3). When the "closed state" in FIG. 3 (*a*) is again entered at time t4, the output signal S1 of the magnetic sensing element 20*a* changes to "1."

Here, the time period during which both the output signals S1 and S2 of the magnetic sensing elements 20*a* and 20*b* are "0" (times t1 to t2, times t3 to t4) is the time period corresponding to the "transition state" in which the first cabinet 30 is slid.

Thus, only the output signal S1 of the magnetic sensing element 20*a* becomes "1" in the "closed state" in FIG. 3 (*a*), both the signals S1 and S2 are "0" in the "transition state" in FIG. 3 (*b*), and only the output signal S2 of the magnetic sensing element 20*b* becomes "1" in the "open state" in FIG. 3 (*c*). Thus, the relative position relation between the first and second cabinets 30 and 31 can be determined from the values of the signals S1 and S2.

The position determination signal S3 output from the positional relation sensing section 23 becomes "1" in the time period of times t1 to t2 and in the time period of times t3 to t4 corresponding to the "transition state" and becomes "0" in other time periods as shown at the bottom of FIG. 4.

The time period during which the output signal S3 of the positional relation sensing section 23 becomes "1" (times t1 to t2, times t3 to t4) becomes the mute period. That is, in the time period, the voice control section 24 outputs the mute control signal S4 to the voice processing section 11, and the voice processing section 11 prohibits all outputs (transmission) of the voice signal collected by the microphone 10 (contact sound produced as the cabinet slides) to the receiver 12 and the loudspeaker 13, to the wireless communication section 16 and the short-range wireless communication section 17, and to the external loudspeaker 15 through the voice output terminal 14.

Such muting of the voice processing section 11 can reliably prevent unnecessary contact sound produced with state change of the cabinet from being output from the mobile telephone terminal and the communication machine of the intended party.

Accordingly, if the user of the mobile telephone terminal holds telephone conversation in the "open state" or the "closed state" and moves the first cabinet 30 for placing the mobile terminal in the "open state" or the "closed state" with the line on hold, output of contact sound produced with a relative move (slide) of the first and second cabinets 30 and 31 is stopped and the contact sound is not output to the communication machine of the intended party.

In the mobile telephone terminal, generally, at the telephone conversation time, the voice of the speaker is collected by the microphone 10 and is output as a sidetone from the receiver 12 so as to enable the speaker to hear his or her voice. Also in this case, the mute operation described above prevents the user from hearing contact sound output from the receiver 12 of the mobile telephone terminal. When the user of the mobile telephone terminal outputs his or her voice from the loudspeaker 13 of the mobile telephone terminal, likewise, if the user slides the first and second cabinets 30 and 31, unnecessary contact sound is not output.

Further, when the user outputs his or her voice from the external loudspeaker 15 connected to the voice output terminal 14 or when the user outputs his or her voice to any other machine using the short-range wireless communication section 17 of Bluetooth, etc., likewise output of unnecessary voice produced by sliding the cabinet can also be prevented.

Second Embodiment

Figure 5:
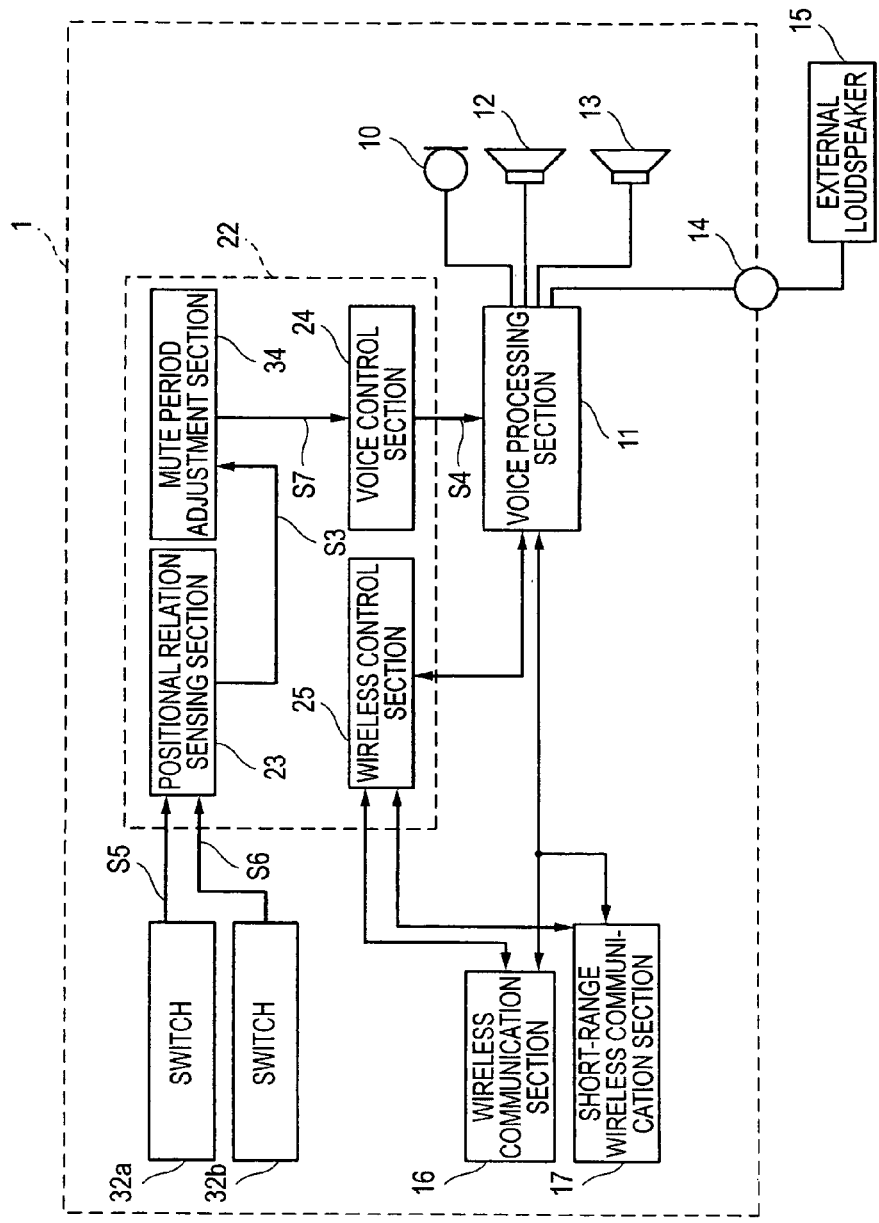
FIG. 5 is a block diagram to show the internal structure of a mobile telephone terminal according to a second embodiment of the invention.
Figure 6A:
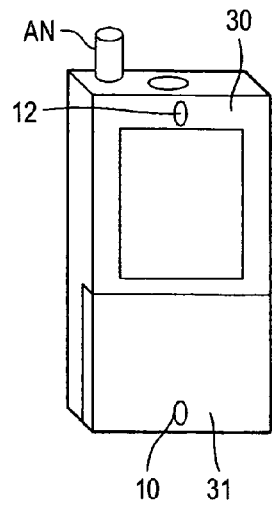
FIG. 6 is a perspective view to show the appearances corresponding to open and closed states of the mobile telephone terminal of the second embodiment; (a) is a drawing to show the open state, (b) is a drawing to show a transition state, and (c) is a drawing to show the closed state.
Figure 6B:
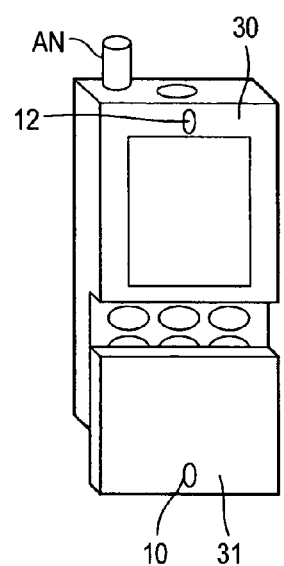
Figure 6C:
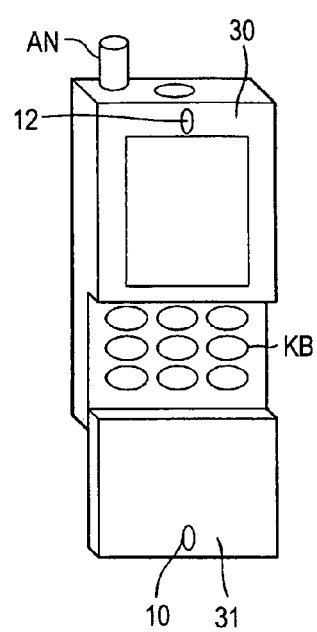

FIG. 5 is a block diagram to show the internal structure of a mobile telephone terminal according to a second embodiment of the invention. FIG. 6 is a perspective view to show the appearances corresponding to an open state, a transition state, and a closed state of the mobile telephone terminal of the second embodiment.

As shown in FIG. 6 (*a*) to FIG. 6 (*c*), a second cabinet 31 slides relative to a first cabinet 30 in the mobile telephone terminal of the second embodiment. However, the second cabinet 31 in the mobile telephone terminal of the second embodiment covers only an operation key KB provided on the first cabinet 30 and the slide move range is narrow as compared with the mobile telephone terminal of the first embodiment shown in FIG. 2. FIG. 6 (*a*) shows the "closed state," (*b*) shows the "transition state," and (c) shows the "open state."

The internal basic structure of the mobile telephone terminal of the second embodiment shown in FIG. 5 is similar to the mobile telephone terminal of the first embodiment shown in FIG. 1. However, the second embodiment differs from the first embodiment in that switches 32a and 32b are provided for sensing the relative position relation between the first and second cabinets and that a control section 22 includes a mute period adjustment section 34. In the second embodiment, the switches 32a and 32b and a positional relation sensing section 23 implement the function of positional relation sensing means.

The mute period adjustment section 34 releases muting with a delay of a predetermined time period from the termination time of slide move of the cabinet, thereby preventing output of contact sound and its echo sound. If muting is released immediately at the termination time of slide move of the cabinet, contact sound produced at the time echoes and if the echo sound continues, the echo sound can be output from a loudspeaker. Then, in the second embodiment, muting is continued only for an additional predetermined time from the point in time at which the open state or the closed state is entered after the termination of slide of the cabinet and then the muting is released, whereby output of echo sound is also reliably prevented.

Figure 7A:
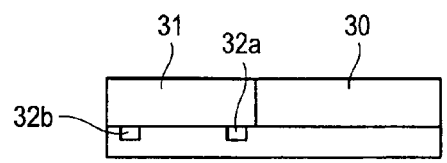
FIG. 7 is a sectional view to describe a mechanism for sensing the relative position relation between cabinets in the mobile telephone terminal of the second embodiment; (a) is a drawing to show the closed state, (b) is a drawing to show the transition state, and (c) is a drawing to show the open state.
Figure 7B:
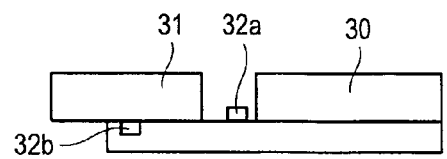
Figure 7C:
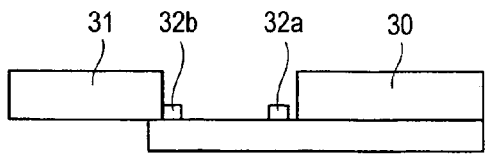

The operation of the positional relation sensing section 23 and the mute period adjustment section 34 responsive to the relative position relation between the first and second cabinets 30 and 31 will be specifically discussed below with reference to FIGS. 7 and 8:

FIG. 7 (a) to FIG. 7 (c) are sectional views to describe a mechanism for sensing the relative position relation between the cabinets in the mobile telephone terminal of the second embodiment and are drawings corresponding to the closed state, the transition state, and the open state. FIG. 8 is a timing chart to describe the operation of the positional relation sensing section 23 and the mute period adjustment section 34 in the second embodiment.

In the "closed state" shown in FIG. 7 (a), both the switches 32a and 32b are positioned below the second cabinet 31 and are pressed by the second cabinet 31. Here, the state in which each switch is pressed by the second cabinet 31 is the state in which the switch is effective. In FIG. 7 (a), both the switches 32a and 32b are effective.

In the transition state in FIG. 7 (b), only the switch 32b is effective and the switch 32a is ineffective. In the open state in FIG. 7 (c), both the switches 32a and 32b are ineffective. Therefore, change in the relative position between the first and second cabinets 30 and 31 can be sensed based on the sensing signals of the two switches 32a and 32b.

Figure 8:
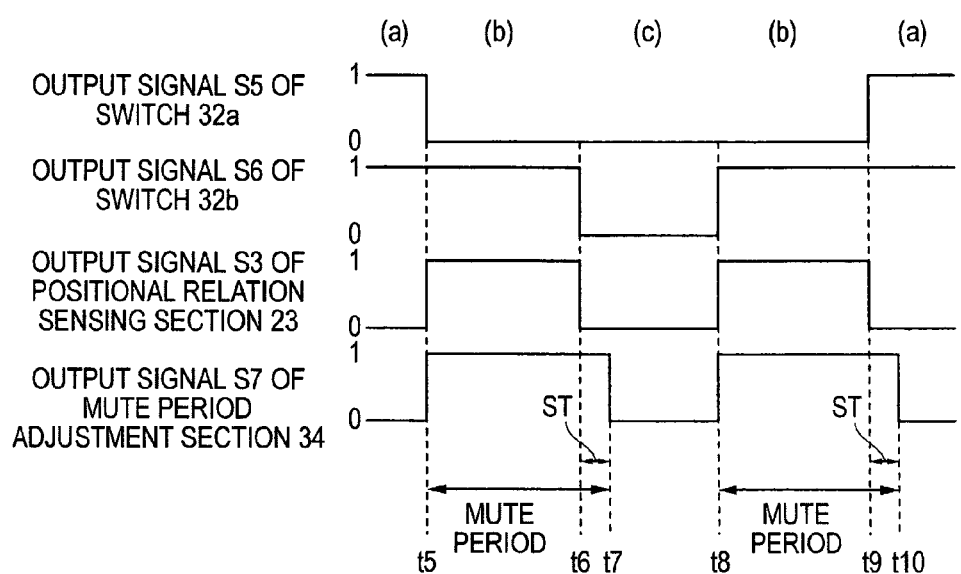
FIG. 8 is a timing chart to describe the operation of a positional relation sensing section and a mute period adjustment section in the second embodiment.

The positional relation sensing section 23 performs the operation shown in FIG. 8 based on the sensing signals of the two switches 32a and 32b and outputs a position determination signal S3 indicating the determination result of the relative position relation between the cabinets 30 and 31. This position determination signal S3 is fed into the mute period adjustment section 34.

The mute period adjustment section 34 prolongs the time period during which the position determination signal S3 is active only a predetermined time period ST and outputs a mute period signal S7 (namely, the falling edge of the termination of the position determination signal S3 is delayed only the predetermined time period ST).

(a) to (c) shown at the top of FIG. 8 correspond to the states in FIG. 7 (a) to FIG. 7 (c). In FIG. 8, in the "closed state" in FIG. 7 (a), both the switches 32a and 32b are in the effective state and output signals S5 and S6 are both "1."

When the second cabinet 31 is slid from this state and the "transition state" in FIG. 7 (b) is entered (time t5), the switch 32a becomes ineffective and the output signal S5 changes to "0." When the "open state" in FIG. 7 (c) is entered, the switch 32b also becomes ineffective and both the output signals S5 and S6 of the switches change to "0" (time t6).

Subsequently, when the second cabinet 31 is slid and the "transition state" is entered, the switch 32b enters the effective state and the output signal S6 changes to "1" (time t8). When the "closed state" in FIG. 7 (a) is again entered at time t9, both the output signals S5 and S6 of the switches 32a and 32b become "1."

Here, the time period during which the output signal S5 of the switch 32a is "0" and the output signal S6 of the switch 32b is "1" (times t5 to t6, times t8 to t9) is the time period corresponding to the "transition state" in which the second cabinet 31 is slid. Therefore, the time period of the times t5 to t6 and the time period of the times t8 to t9 become mute periods. The position determination signal S3 output from the positional relation sensing section 23 becomes "1" in the time periods of the times t5 to t6 and the times t8 to t9.

However, if muting is released immediately at the termination time of slide move of the second cabinet 31 (time t7, t9), the echo sound of the contact sound produced at the time continues and can be output from the loudspeaker. Thus, the mute period adjustment section 34 prolongs the mute period only the predetermined time period ST. That is, the mute period signal S7 output from the mute period adjustment section 34 falls with a delay of the predetermined time period ST from the termination time of slide move of the second cabinet 31 (time t7, t9) (time t10).

A voice control section 24 outputs a mute control signal S4 to a voice processing section 11 based on the mute period signal S7. The voice processing section 11 prohibits all outputs (transmission) of the voice signals collected by a microphone 10 (signals of contact sound produced as the cabinet slides and its echo sound) to a receiver 12 and a loudspeaker 13, to a wireless communication section 16 and a short-range wireless communication section 17, and to an external loudspeaker 15 through a voice output terminal 14.

Thus, the muting of the voice processing section 11 is performed based on the mute period signal S7 output from the mute period adjustment section 34 and consequently the mute period is prolonged only the predetermined time period ST. Therefore, if the contact sound produced at the termination time of slide move of the second cabinet 31 echoes and the echo sound continues, a situation in which the echo sound is output from the loudspeaker, etc., does not occur.

Therefore, output of an unpleasant contact sound occurring when the cabinet moves to the receiver and the loudspeaker of the mobile telephone terminal, the intended party through a base station, a machine connected for short-range wireless communications of Bluetooth, etc., a machine connected to the voice output terminal, and the like is prohibited completely.

In the description given above, the mobile telephone terminal having the cabinets of the slide-type open and closed structure is taken as an example, but the invention is not limited to it and can also be applied to a PDA, a notebook computer, etc.

The invention can also be applied to any structure if the structure is a structure for making a relative move to the face where two or more cabinets come in contact with each other. For example, if a first cabinet pivots relative to a second cabinet, when a contact sound is produced while the first cabinet pivots, the invention can be applied for prohibiting output of the contact sound. This means that it can be considered that pivoting of the cabinet is also a kind of slide move.

As described above, according to the invention, when the cabinet makes a slide move, the muting operation is performed for prohibiting output of the signals collected by the microphone of the mobile telephone terminal, whereby output of an unnecessary sound such as a contact sound through the loudspeaker can be prevented reliably. The muting operation is released with a delay of a predetermined time from the termination time of the slide move of the cabinet, so that output of an echo sound of a contact sound, etc., can also be prevented reliably. Therefore, in the actual use of the mobile terminal apparatus, giving offense to the user, etc., can be prevented and pleasant use of the mobile terminal apparatus is made possible. The embodiment involves the simple structure and is easy to implement.

While the invention has been described in detail with reference to the specific embodiments, it will be obvious to those skilled in the art that various changes and modifications can be made without departing from the spirit and the scope of the invention.

The present application is based on Japanese Patent Application No. 2003-357242 filed on Oct. 17, 2003, which is incorporated herein by reference.

INDUSTRIAL APPLICABILITY

The invention has the advantages that an unnecessary sound produced when the cabinet is slid and moved can be prevented from being output through the voice output means of a mobile terminal apparatus and the intended party and the mobile terminal apparatus can be used comfortably, and is useful for the mobile terminal apparatus, etc., such as a mobile telephone terminal and a personal digital assistant (PDA) each having cabinets of a slide-type open and closed structure.

The invention claimed is:

1. A mobile terminal apparatus which can be opened and closed as a first cabinet slides and moves relative to a second cabinet, comprising:
    a voice input section;
    a voice output section;
    a communication section for communicating a voice signal input from the voice input section to an intended party;
    a positional relation sensing unit which senses the relative position relation between the first cabinet and the second cabinet; and
    a voice control unit which inhibits signal transmission from the voice input section to the voice output section and signal transmission from the voice input section to the communication section for muting if the first and second cabinets are in a slide move state from a fully open state to a fully closed state based on output of the positional relation sensing unit, and which inhibits signal transmission from the voice input section to the voice output section and signal transmission from the voice input section to the communication section for muting if the first and second cabinets are in a slide move state from the fully closed state to the fully open state based on output of the positional relation sensing unit;
    wherein the voice control unit continues the muting for a predetermined time period from the point in time when the first and second cabinets reach the fully open state or the fully closed state from the slide move state, and
    wherein the voice control unit releases the muting after the expiration of the predetermined time period.

2. The mobile terminal apparatus according to claim 1, wherein the positional relation sensing unit comprises:
    a magnetic material provided at least in one of the first cabinet and the second cabinet; and
    a magnetic sensing element, provided in the cabinet opposed to the cabinet in which the magnetic material is disposed, for sensing a magnetic field of the magnetic material.

3. The mobile terminal apparatus according to claim 1, wherein the positional relation sensing unit comprises a switch which is provided at least in one of the first cabinet and the second cabinet and is pressed as the opposed cabinet makes a slide move.

* * * * *